Dec. 27, 1955  K. TOLLE  2,728,266
TELEPHOTO ATTACHMENT FOR PHOTOGRAPHIC OBJECTIVES
Filed April 30, 1954
Fig. 1
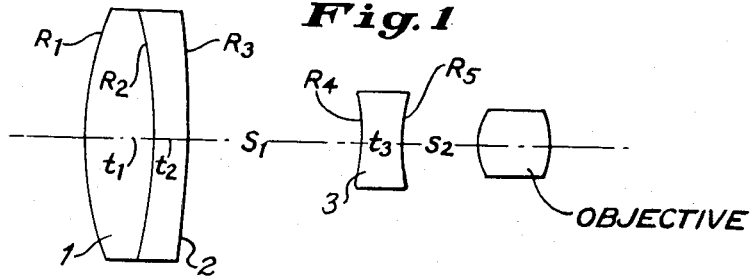
Fig. 2
| LENS | N | V | RADII | THICKNESSES |
|---|---|---|---|---|
| 1 | 1.517 | 64.5 | $R_1 = +33.4$ mm. | $t_1 = 9.0$ mm. |
| 2 | 1.720 | 29.3 | $R_2 = -52.0$ | $t_2 = 4.0$ |
|   |       |      | $R_3 = -12.2$ | $S_1 = 16.2$ |
| 3 | 1.517 | 64.5 | $R_4 = -54.4$ | $t_3 = 5.7$ |
|   |       |      | $R_5 = +25.5$ | $S_2 = 7.3$ |
Fig. 3
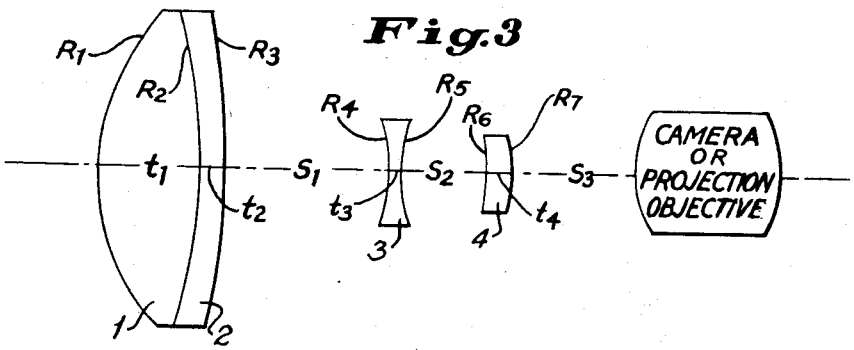
Fig. 4
| LENS | N | V | RADII | THICKNESSES |
|---|---|---|---|---|
| 1 | 1.511 | 63.5 | $R_1 = +29.0$ mm. | $t_1 = 13.2$ mm. |
| 2 | 1.720 | 29.3 | $R_2 = -74.6$ | $t_2 = 3.1$ |
|   |       |      | $R_3 = -661.0$ | $S_1 = 21.7$ |
| 3 | 1.526 | 54.6 | $R_4 = -21.6$ | $t_3 = 1.3$ |
|   |       |      | $R_5 = +21.6$ | $S_2 = 10.5$ |
| 4 | 1.617 | 38.5 | $R_6 = -50.4$ | $t_4 = 3.0$ |
|   |       |      | $R_7 = -26.4$ | $S_3 = 2.0$ |
Karl Tolle
INVENTOR.
BY Daniel I. Mayne
Harold F. Bennett
ATTORNEY & AGENT

United States Patent Office 2,728,266
Patented Dec. 27, 1955

2,728,266

TELEPHOTO ATTACHMENT FOR PHOTOGRAPHIC OBJECTIVES

Karl Tolle, Rochester, N. Y., assignor to Eastman Kodak Company, Rochester, N. Y., a corporation of New Jersey Application April 30, 1954, Serial No. 426,681

5 Claims. (Cl. 88—57)

This invention relates to telephoto attachments for photographic objectives.

The object of the invention is to provide an afocal or substantially afocal telephoto attachment for cameras and projection objectives having a magnification between 1.5 and 2.0, or such that it will convert for example a 13 mm. objective covering a field of about ±12° into an objective having a focal length between 19 and 26 mm. and covering a field between about ±8° and ±6° while maintaining good correction of aberrations.

Wide-angle and telephoto attachments are well known in theory, being equivalent to a Galilean telescope mounted in front of the objective either reversed or in the usual manner respectively, but only the former has gained wide acceptance. This is because heretofore the telephoto attachments which have been well corrected have been so complex in structure that it is economically and practically preferable to provide a longer focal length objective which would be substituted for the standard objective than to provide an attachment to be added to the objective.

According to the present invention, a telephoto attachment is made up of a front positive member and a rear negative member in which the front positive member consists of a front biconvex element and a negative meniscus element of higher refractive index cemented thereto, the index difference being between 0.18 and 0.30, the rear member comprises a biconcave element and has an overall thickness greater than 5% of the focal length of the front member, the front member has a focal length between 1.5 and 2.0 times that of the rear member and the two members are afocally spaced or at least substantially so.

I have discovered that the large index difference in the front member is important in maintaining a flat field and that best results are obtained by choosing the dispersive index $V_2$ of the negative element in the range of 0.38 $V_1$ to 0.55 $V_1$ and by acromatizing the system so that there is a balance between the axial and the lateral color in the manner well understood in the art. The dispersion $V_1$ of the front element is conveniently between 58 and 100.

The great thickness of the negative member is chosen primarily for mechanical reasons to permit mounting the attachment close to the objective in lens barrels of the style so common today in which the barrel itself extends far in front of the objective proper and the attachment accordingly has to extend into the hollow thus formed. This thickness also aids in controlling the distortion and may be as great as about 0.3 $f_1$ where $f_1$ is the focal length of the front member.

The ratio of focal lengths, of course, defines the magnification, and the range from 1.5 to 2.0 is the most useful range for attachments of the simple structure described herein and the range in which they are satisfactorily corrected.

In a preferred form of the invention the radii of curvature R of the optical surfaces of the three lens elements, identified by subscripts as numbered from front to rear are within the following limits:

$0.4f_1 < +R_1 < 0.7f_1$
$0.7f_1 < -R_2 < 3\ f_1$
$1.3f_1 < -R_3 < \infty$
$0.8f_1/M < -R_4 < 3.5f_1/M$
$0.4f_1/M < +R_5 < 1.6f_1/M$ where M is the magnification of the attachment. These radii have been found to give highly satisfactory correction of aberrations. The magnification is a factor in determining the radii of curvature in the negative member since a higher magnification involves a shorter focal length of this member.

According to a simple and inexpensive species of the invention the negative rear member consists entirely of the biconcave element mentioned above. By choosing a dispersive index $V_3$ between 55 and 100 satisfactory color correction can be obtained with short focal length objectives. The refractive index of this element is conveniently between 1.43 and 1.6. In this species of the invention the thickness of the negative member is preferably less than 0.18 $f_1$, and its front surface preferably has a radius of curvature between 1.6 and 3.0 times that of its back surface.

According to another species of the invention the negative member includes also a positive element weaker than and behind the negative element, the negative element being of course stronger than in the species in which it constitutes the whole rear member. This poisitive element should have a higher refractive index and a lower dispersive index than the negative element to help control the curvature of field and color. It may be cemented to the negative element, but I prefer to space it therebehind by more than 0.05 $f_1$ and less than 0.25 $f_1$ to gain the great thickness of the negative member which is desirable for reasons described above. In this species the two surfaces of the biconcave element are preferably roughly equal in curvature, the radius in each case being preferably between 0.55 $f_1/M$ and 0.75 $f_1/M$. The positive element is preferably a meniscus concave to the front. The radius of curvature of its front surface is preferably between 1.1 $f_1/M$ and 2.3 $f_1/M$ and that of its rear surface between 0.65 $f_1/M$ and $f_1/M$ to best gain the advantages of the spacing from the negative component.

In the accompanying drawing:

Fig. 1 shows a lens attachment according to one embodiment of the invention in diagrammatic axial section.

Fig. 2 gives constructional data for one example according to Fig. 1.

Fig. 3 shows another embodiment of the invention.

Fig. 4 gives constructional data for one example according to Fig. 3.

The data of Figs. 2 and 4 is given on a scale suitable for making up an attachment for use with objectives of about 13 mm. focal length, and is as follows:

| Lens | N | V | Radii, mm. | Thicknesses, mm. |
|---|---|---|---|---|
| 1 | 1.517 | 64.5 | $R_1 = +33.4$ | $t_1 = 9.0$ |
| 2 | 1.720 | 29.3 | $R_2 = -52.0$ | $t_2 = 4.0$ |
|   |       |      | $R_3 = -122$  | $s_1 = 16.2$ |
| 3 | 1.517 | 64.5 | $R_4 = -54.4$ | $t_3 = 5.7$ |
|   |       |      | $R_5 = +25.5$ | $s_2 = 7.3$ | in Fig. 2, and

Example 1, Figs. 1 and 2
[M=1.8]

| Lens | N | V | Radii, mm. | Thicknesses, mm. |
|---|---|---|---|---|
| 1 | 1.517 | 64.5 | $R_1=+\ 57.72$ | $t_1=15.6$ |
|   |       |      | $R_2=-\ 89.97$ |               |
| 2 | 1.720 | 29.3 |                | $t_2=\ 6.9$ |
|   |       |      | $R_3=-210.6$   |               |
|   |       |      |                | $s_1=28.1$   |
|   |       |      | $R_4=-\ 94.20$ |               |
| 3 | 1.517 | 64.5 |                | $t_3=\ 9.9$ |
|   |       |      | $R_5=+\ 44.03$ |               |
|   |       |      |                | $s_2=12.5$   |

| Lens | N | V | Radii, mm. | Thicknesses, mm. |
|---|---|---|---|---|
| 1 | 1.511 | 63.5 | $R_1=+\ 29.0$ | $t_1=13.2$ |
|   |       |      | $R_2=-\ 74.6$ |             |
| 2 | 1.720 | 29.3 |               | $t_2=\ 3.1$ |
|   |       |      | $R_3=-661.0$  |             |
|   |       |      |               | $s_1=21.7$ |
|   |       |      | $R_4=-\ 21.6$ |             |
| 3 | 1.526 | 54.6 |               | $t_3=\ 1.3$ |
|   |       |      | $R_5=+\ 21.6$ |             |
|   |       |      |               | $s_2=10.5$ |
|   |       |      | $R_6=-\ 50.4$ |             |
| 4 | 1.617 | 38.5 |               | $t_4=\ 3.0$ |
|   |       |      | $R_7=-\ 26.4$ |             |
|   |       |      |               | $s_3=\ 2.0$ | in Fig. 4.

Equivalent data is given below scaled up to make the focal length $f_1$ of the positive member a standard 100 mm. to facilitate comparison with other systems. M is the magnification defined as the ratio of the focal length of the positive member to that of the negative member.

Example 2, Figs. 3 and 4
[M=1.8]

| Lens | N | V | Radii, mm. | Thicknesses, mm. |
|---|---|---|---|---|
| 1 | 1.511 | 63.5 | $R_1=+\ 47.06$ | $t_1=21.4$ |
|   |       |      | $R_2=-121.0$   |             |
| 2 | 1.720 | 29.3 |                | $t_2=\ 5.0$ |
|   |       |      | $R_3=-1072$    |             |
|   |       |      |                | $s_1=35.2$ |
|   |       |      | $R_4=-\ 35.08$ |             |
| 3 | 1.526 | 54.6 |                | $t_3=\ 2.1$ |
|   |       |      | $R_5=+\ 35.08$ |             |
|   |       |      |                | $s_2=17.0$ |
|   |       |      | $R_6=-\ 81.73$ |             |
| 4 | 1.617 | 38.5 |                | $t_4=\ 4.9$ |
|   |       |      | $R_7=-\ 42.82$ |             |
|   |       |      |                | $s_3=\ 3.2$ |

In these tables as in the figures the lens elements are numbered in order from front to rear in the first column, the corresponding refractive indices N for the D line of the spectrum and the conventional dispersive indices V are given in the second and third columns, the radii of curvature R of the lens surfaces, the thicknesses $t$ of the lens elements, and the spaces $s$ between lens components, each numbered by subscripts from front to rear are given in the last two columns. The + and − values of the radii denote surfaces respectively convex and concave to the front. The last spacing given, i. e. $s_2$ and $s_3$ respectively, is the spacing between the rear surface of the attachment and the front surface of a specific objective which is Example 1 of U. S. Patent 2,503,751 Litten, Aklin and Altman in the case of Example 2 and a lens similar to that in the case of Example 1. For other objectives this spacing would be slightly different.

It is evident from these tables, either directly or by simple calculation, that each example embodies the principal features of the invention as set forth above and in the appended claims.

Example 1, Fig. 1, is a simple form of the invention in which the front member is a substantially achromatic doublet and the rear member a simple biconcave lens element. While it is not possible to completely correct both the longitudinal and lateral color without achromatizing both members, I have found that the great thickness of the negative member previously mentioned helps to reduce the lateral color to within tolerable limits.

Example 2, Fig. 3 is a slightly more complex form of the invention in which the negative member consists of a biconcave element and a meniscus positive element spaced apart to give the great thickness of the negative member which has been described above as desirable for the purposes of the invention. By making both members compound it is possible by known procedures of lens design to correct both the lateral and longitudinal color. In the present case the goal has been to attain the best correction for the whole system of attachment and objective. Objectives as a rule do not differ greatly in color correction, however, and the attachment is useful with other objectives as well.

It is to be understood that the invention is not limited to the examples given but is of the scope of the appended claims.

I claim:

1. A telephoto attachment for mounting in front of a photographic objective, comprising a rear negative member and coaxial therewith a front positive member which has a focal length $f_1$ between 1.5 and 2.0 times that of the negative member and which is optically separated from the negative member by substantially the difference between the focal lengths of the two members whereby the two members form a substantially afocal system, characterized by the front member consisting of a front biconvex lens element and a negative meniscus element cemented to the back thereof and by the negative member comprising at least a biconcave element, in which three elements the refractive indices N for the D line of the spectrum, the dispersive indices V, and the radii of curvature R of the lens surfaces, each numbered by subscripts from front to rear, are within the limits set forth as follows:

$$1.4 < N_1 < 1.58$$
$$(N_1+0.18) < N_2 < (N_1+0.3)$$
$$1.43 < N_3 < 1.6$$
$$58 < V_1 < 100$$
$$0.38V_1 < V_2 < 0.55V_1$$
$$55 < V_3 < 100$$
$$0.4f_1 < +R_1 < 0.7f_1$$
$$0.7f_1 < -R_2 < 3f_1$$
$$1.3f_1 < -R_3 \leq \infty$$
$$0.8f_1/M < -R_4 < 3.5f_1/M$$
$$0.4f_1/M < +R_5 < 1.6f_1/M$$

where M is the magnification defined as the ratio of the focal length of the positive member to that of the negative member and in which the thickness of each member is between 0.05 $f_1$ and 0.3 $f_1$.

2. A lens attachment according to claim 1 in which the negative member includes also a positive element weaker than and behind the said negative element and made of a glass having a higher refractive index and lower dispersive index.

3. A lens attachment according to claim 1 in which the negative member includes also a positive element weaker than said negative element and spaced therebehind by more than 0.05 $f_1$ and less than 0.25 $f_1$ and in which the refractive index of said positive element is between 1.55 and 1.70, its dispersive index between 0.5 $V_3$ and 0.8 $V_3$.

4. A telephoto attachment for mounting in front of a photographic objective, comprising a rear negative member and coaxial therewith a front positive member which has a focal length $f_1$ between 1.5 and 2.0 times that of the negative member and which is optically separated from the negative member by substantially the difference between the focal lengths of the two members whereby the two members form a substantially afocal system, characterized by the front member consisting of a front biconvex lens element and a negative meniscus element cemented to the back thereof in which the refractive index of the negative element is greater than that of the biconvex element by between 0.18 and 0.30 and by the negative member consisting of a biconcave element having a refractive index between 1.43 and 1.6 and a thickness between 0.05 $f_1$ and 0.18 $f_1$, and so shaped that the front surface thereof has a radius of curvature between 1.6 and 3.0 times that of the rear surface.

5. A telephoto attachment for mounting in front of a photographic objective, comprising a rear negative member and coaxial therewith a front positive member which has a focal length $f_1$ between 1.5 and 2.0 times that of the negative member and which is optically separated from the negative member by substantially the difference between the focal lengths of the two members whereby the two members form a substantially afocal system, characterized by the front member consisting of a front biconvex lens element and a negative meniscus element cemented to the back thereof, in which the refractive index of the negative element is greater than that of the biconvex element by between 0.18 and 0.30 and by the negative member consisting of a biconcave element and a meniscus positive element spaced therebehind by between 0.05 $f_1$ and 0.25 $f_1$, the radius of curvature of each surface of the biconcave element being numerically between 0.55 $f_1/M$ and 0.75 $f_1/M$ and the radii of curvature of the front and rear surfaces of the positive element being numerically between 1.1 $f_1/M$ and 2.3 $f_1/M$ and between 0.65 $f_1/M$ and $f_1/M$, respectively, where M is the ratio of the focal length of the positive member to that of the negative member, and the refractive indices of the two elements of the negative member being between 1.45 and 1.6 and between 1.55 and 1.7 respectively and the dispersive index of the positive element being between 0.5 and 0.8 times that of the biconcave element.

References Cited in the file of this patent

UNITED STATES PATENTS

| | | |
|---|---|---|
| 756,779 | Dallmeyer | Apr. 5, 1904 |
| 1,651,493 | Warmisham | Dec. 6, 1927 |
| 2,184,018 | Ort | Dec. 19, 1939 |
| 2,503,751 | Litten et al. | Apr. 11, 1950 |
| 2,514,591 | Skopal | July 11, 1950 |

FOREIGN PATENTS

| | | |
|---|---|---|
| 222,709 | Great Britain | Oct. 9, 1924 |